Patented July 8, 1947

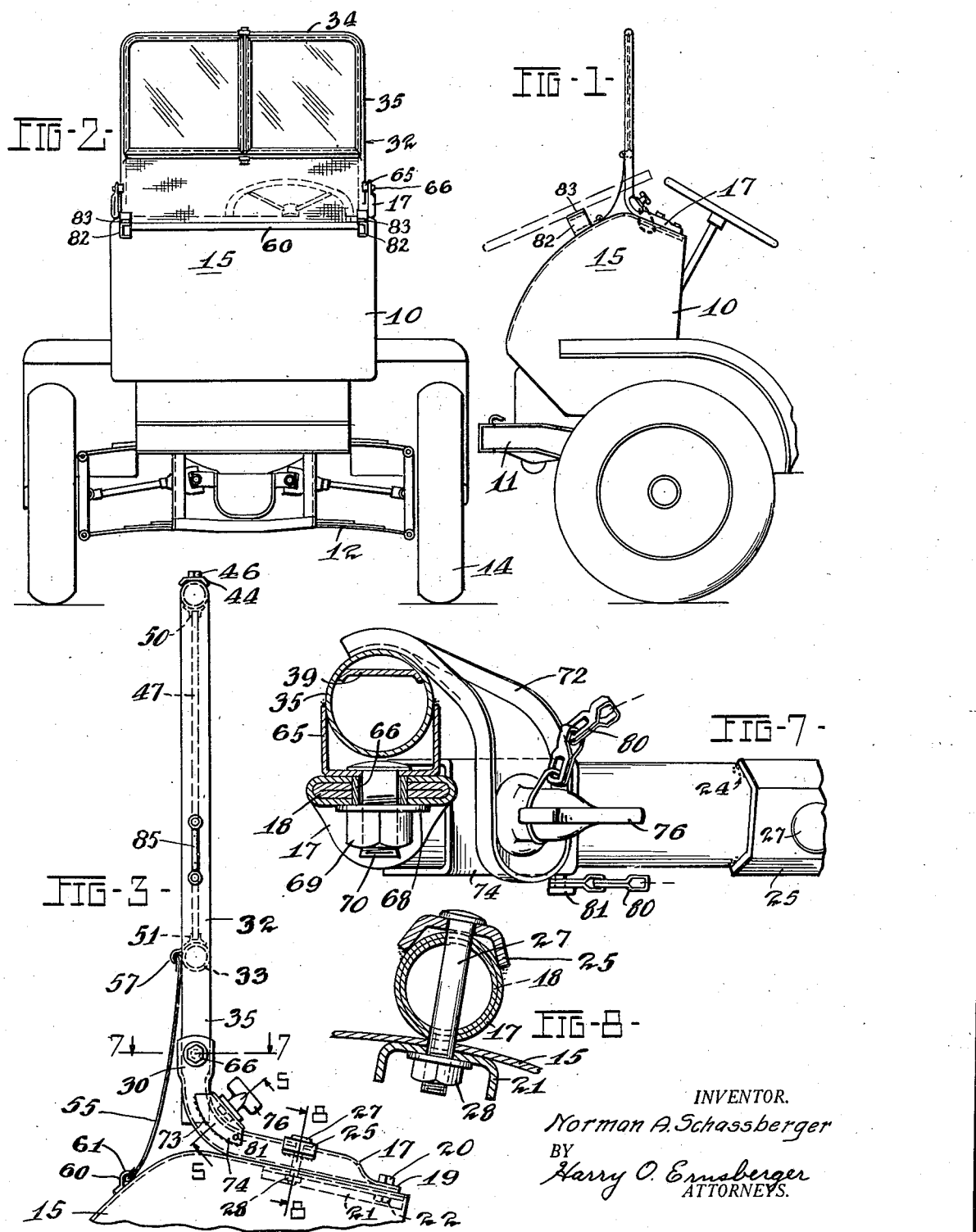

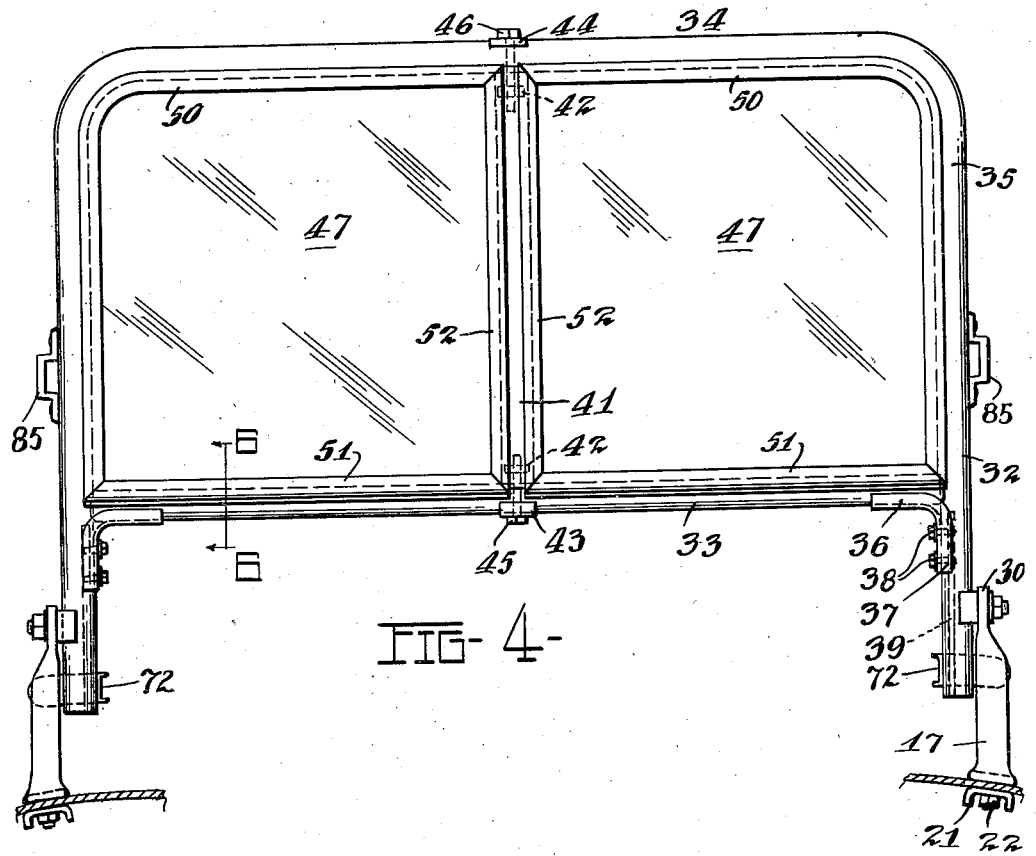
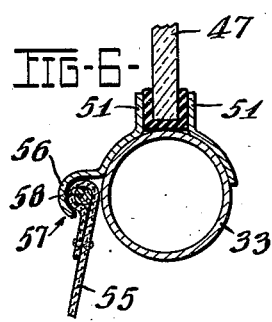
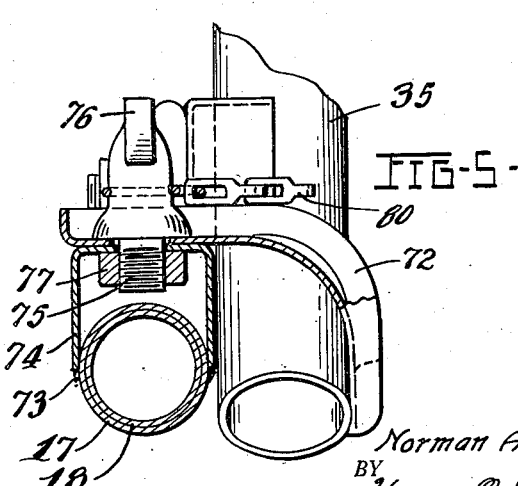

2,423,623

UNITED STATES PATENT OFFICE 2,423,623

WINDSHIELD AND MOUNTING

Norman A. Schassberger, Toledo, Ohio, assignor to Willys-Overland Motors, Inc., Toledo, Ohio, a corporation of Delaware Application January 24, 1944, Serial No. 519,561

2 Claims. (Cl. 296—92)

This invention relates to vehicles and more particularly to a windshield construction and mounting therefor.

The invention comprehends the provision of a windshield and mounting arrangement which is especially adaptable to withstand shocks and stresses encountered by the vehicle traveling over rough terrain.

An object of the invention is the provision of a windshield and mounting which is strong and sturdy and capable of withstanding shocks, yet one which provides a degree of resilience when struck by tree limbs or other overhanging objects whereby the liability of damage to the windshield is minimized.

Another object is the provision of a windshield and mounting especially arranged so that the windshield may be swung forwardly to an out-of-use position, an especially desirable feature when the invention is used on combat vehicles where a low silhouette is desirable.

Another object of the invention resides in a reinforced tubular windshield frame support which is light in weight and capable of withstanding severe shock without being damaged.

Still a further object is the provision of a windshield and mounting which is capable of being incorporated in various types of vehicles.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

Figure 1 is a side elevational view of the forward portion of a vehicle illustrating a form of windshield and mounting of my invention;

Figure 2 is a front elevational view of the windshield and mounting;

Figure 3 is a side elevational view showing the windshield and mounting;

Figure 4 is a front elevational view of the arrangement illustrated in Figure 3 showing a portion of the windshield;

Figure 5 is a sectional view taken substantially on the line 5—5 of Figure 3;

Figure 6 is a sectional view taken substantially on the line 6—6 of Figure 4;

Figure 7 is a sectional view taken substantially on the line 7—7 of Figure 3;

Figure 8 is a sectional view taken substantially on the line 8—8 of Figure 3.

The windshield and mounting construction of my invention is illustrated as embodied in a vehicle especially adapted for combat activity, but it is to be understood that I contemplate the use of my invention with any type of vehicle wherein the same may be found to have utility.

Referring to the drawings in detail, Figure 1 illustrates a forward portion of a vehicle having a body 10 supported upon a frame 11, the frame being connected by springs 12 to road wheels 14. The body portion of the vehicle is provided with a cowl 15 upon which is supported the windshield and mounting of my invention. Positioned adjacent each end of the cowl portion 15 is a hollow tubular bracket 17, each of these brackets being reinforced by a sleeve or tube 18 arranged interiorly and coextensive with the bracket 17. One end of each of the brackets 17 and reinforcing sleeve 18 are flattened as at 19, the flattened portion 19 being provided with an opening to accommodate a securing bolt 20 which passes through the cowl portion through a reinforcing plate 21 and is secured in position by means of a nut 22. Spaced from the flattened portion 19 and welded as at 24 or otherwise fixedly secured to the bracket 17 is a U-shaped member or reinforcing saddle 25 provided with a suitable opening in alignment with openings in the side walls of bracket 17 and reinforcing sleeve 18 to receive a bolt 27 which is secured in position by means of nut 28. It will be apparent that the bolts 19 and 27 fixedly secure the brackets 17 to the cowl portion of the vehicle which is reinforced by means of plate 21.

Each of the tubular brackets 17 and their respective reinforcements is curved upwardly as particularly shown in Figure 3, the construction terminating in a flattened portion 30. The windshield construction of my invention is inclusive of a frame structure preferably formed of hollow tubes 32 and 33, tube 32 being generally of U-shaped configuration having a transverse portion 34 and parallel leg portions 35.

The extremities of the transversely extending tube 32 are welded or otherwise secured to L-shaped members 36. The depending legs 37 of each L-shaped member 36 contacts the exterior surface of the vertical portions 35 of the frame 32 and are secured thereto by means of bolts 38, the threaded extremities of which engage in threaded openings in a reinforcing strip 39 welded to an interior wall of each of the parallel tubular portions 35. Midway between the parallel portions 35 and extending between the horizontal portions 33 and 34 of the frame is a tubular upright 41. Positioned interiorly of and adjacent each end of tube 41 are nuts 42 which are welded to the walls of tube 41. Welded to each of the tubes 33 and 34 are saddles 43 and 44, which with the walls of the tubes are provided with aligned openings to accommodate the securing bolts 45 and 46, the latter threading into the nuts 42 in order to hold the tube 41 in proper position.

The tube 41 divides the space between tubes 33 and 34 into two substantially rectangular configurations which are adapted to receive panes 47 formed of glass or other suitable transparent substitute. The panes of transparent material 47 are retained in position in suitable channels formed by pairs of members 50, 51 and 52 which are respectively secured by welding or other suitable means to the tubular members 32, 33 and 41 as shown in Figure 4. The assembly of the glazed windows or panes 47 is readily accomplished by slipping the panes 47 into channels formed by members 50 and 52 before the tube 33 is assembled to the frame 32. After the panes or transparent material are in position, the tube 33 may be fitted into the position shown in Figure 4 and retained by means of bolts 38, while the central portion of tube 33 is held to the tube 41 by means of bolt 45. This arrangement also facilitates easy removal and replacement of broken panes as it is a simple matter to remove the bolts 38 and 45 which disconnects the tube 33 from the frame 32 and upright 41.

The space between the transversely extending tube 33 and the cowl 15 is preferably closed by means of a flexible shield 55 of canvas or other suitable material. Welded to the tube 33 and coextensively arranged therewith is a member 56 terminating in a hook-like portion 57 which embraces or receives a welt 58 formed at the upper edge of the flexible shield 55. Welded or otherwise secured to the cowl and extending transversely thereof is a member 60 having a hook-like portion 61 which takes over or embraces a welt 62 formed on the lower edge of the shield 55.

Secured to each of the leg portions 35 of the frame is a clip or bracket 65 welded or otherwise secured thereto, the bight portion of each bracket 65 being formed with a non-circular opening adapted to accommodate a bolt 66 having a flattened portion arranged to fit in the non-circular opening in bracket 65. Each of the bolts 66 project through openings in flattened portions 30 formed on brackets 17, the openings in portions 30 being large enough to accommodate spacing collars 67 surrounding bolts 66. A washer 68 is received on the bolt which is held in place by means of a nut 69, the end of the bolt being swaged or upset as at 70 to prevent inadvertent removal of the nut. Each collar 67 sufficiently spaces the washer 68 from the clip 65 so that the windshield frame structure may journal about the axis of bolts 66 without undue friction being created by engagement of flattened portion 30 with either clip 65 or the washer 68.

Secured to the lower portion of each of the legs 35 of the frame structure is a member 72 being spot welded or otherwise fixedly secured to the frame. Welded to each of the brackets 17 as at 73 is a member 74 of U-shaped configuration which forms an abutment engaged by the member 72 when the windshield is in vertical position as shown in Figures 1 and 3. Each member 72 and the bracket 74 with which it engages are formed with aligned openings to accommodate the threaded tenon portion 75 of a thumb or winged screw 76. Welded to the bight portion of member 74 is a nut 77 adapted to receive the threaded tenon 75 of the thumb screw 76. When the thumb screw is in the position indicated in Figures 1 and 3, the windshield frame 32 is securely held in upright or vertical operative position. The neck of the thumb screw is surrounded by the end loop portion of the leash or chain 80, the other end of the chain passing through an opening 81 formed in member 74. Thus when the thumb screw 76 is disengaged from the nut 77, the chain 80 secures the thumb screw to the member 74 to prevent inadvertent loss of the thumb screw.

The windshield and frame in normal or operative position are illustrated in full lines in Figures 1 and 3. When it is desired to fold the windshield and frame forwardly to the position shown in dotted lines in Figure 1, it is only necessary to remove the thumb screw 76 after which the frame 32 may be pivoted forwardly about the axis of the bolts 66 acting as journals, the windshield frame in this position resting upon brackets or seats 82 secured to the cowl 15. The brackets are preferably provided with a non-metallic pad 83 of felt, rubber or other suitable yielding material which is engaged by the parallel portions 35 of the windshield frame 32 when the latter is folded forwardly.

A bracket 85 is secured to each of the parallel portions 35 and serves to accommodate straps (not shown) for securing the windshield to the brackets 82 when the same is in lowered position.

It is apparent that, within the scope of the invention, modifications and different arrangements may be made other than is herein disclosed, and the present disclosure is illustrative merely, the invention comprehending all variations thereof.

What I claim is:

1. In a motor vehicle a body having a cowl; a windshield supporting means including a tubular bracket arranged at each side of said cowl; a reinforcing tube positioned within each of said tubular brackets, the extremities of said tubular brackets and reinforcing means being flattened; means passing through one of the flattened portions of each of said brackets for securing said brackets to said cowl; additional securing means connecting said brackets to said cowl and spaced from said first mentioned securing means; a windshield frame; means pivotally connecting said windshield frame to the upwardly extending flattened portions of said brackets; cooperating abutments associated with one of said brackets and said windshield frame for determining the operative position of said windshield frame; means associated with said abutments for securing said windshield frame in operative position, said securing means being removable; and a chain connected to said securing means in juxtaposed relation to said abutment means.

2. In a motor vehicle; a body having a cowl; a windshield supporting means including a tubular bracket arranged at each side of said cowl; a reinforcing tube positioned within each of said tubular brackets; the extremities of said tubular brackets and reinforcing means being flattened; reinforcing plates associated with said cowl and respectively disposed adjacent said brackets; means passing through one of the flattened extremities of each of said brackets and through the reinforcing plates for securing the brackets to said cowl and reinforcing plates; additional securing means spaced from said first mentioned securing means connecting said brackets to said cowl and reinforcing plates; a windshield frame; means pivotally connecting the windshield frame to the other flattened extremities of said brackets which extend upwardly from the cowl; an abutment associated with each of said brackets; members secured to said windshield frame and spaced substantially below the pivotal support thereof, said members adapted to extend rearwardly and across said abutments for determining the operative position of said windshield frame; means for releasably securing said windshield frame in operative position, said securing means being removable; and means connected to said securing means for maintaining said securing means in juxtaposed relation to said abutment means.

NORMAN A. SCHASSBERGER.

REFERENCES CITED

The following references are of record in the file of this patent:

UNITED STATES PATENTS

| Number | Name | Date |
|---|---|---|
| 1,348,598 | Stretch | Aug. 3, 1920 |
| 1,434,604 | Galloway | Nov. 7, 1922 |
| 954,101 | Huillier | Apr. 5, 1910 |
| 1,891,778 | Potter | Dec. 20, 1932 |
| 2,319,869 | Kramer | May 25, 1943 |
| 1,998,796 | Von Varendorff | Apr. 23, 1935 |
| 1,074,774 | Collier | Oct. 7, 1913 |
| 1,347,461 | Helpling | July 20, 1920 |
| 1,878,584 | Jones | Sept. 20, 1932 |

FOREIGN PATENTS

| Number | Country | Date |
|---|---|---|
| 7,408 | Great Britain | 1908 |
| 392,410 | France | Sept. 24, 1908 |
| 5,896 | Great Britain | 1907 |
| 458,402 | France | Aug. 5, 1913 |
| 242,098 | Great Britain | Nov. 5, 1925 |
| 18,126 | France | Dec. 1, 1913 |
| | (1st addition to 458,338) | |